United States Patent [19]

Moore

[11] 4,450,867
[45] May 29, 1984

[54] DIVERTER VALVE AND ACTUATOR ASSEMBLY

[75] Inventor: James C. Moore, Rockwall, Tex.

[73] Assignee: Teledyne Industries, Inc., Los Angeles, Calif.

[21] Appl. No.: 415,857

[22] Filed: Sep. 8, 1982

[51] Int. Cl.³ .......................... F16K 11/00; F16K 3/04
[52] U.S. Cl. .......................... 137/625.44; 137/DIG. 2; 251/80; 251/279; 74/470; 74/517
[58] Field of Search ...................... 137/625.44, DIG. 2, 137/875, 879; 251/229, 177, 232, 243, 279, 80, 228; 74/470, 517, 96

[56] References Cited

U.S. PATENT DOCUMENTS

| 556,547 | 3/1896 | Marichal | 251/80 |
|---|---|---|---|
| 1,137,401 | 4/1915 | Haymond | 251/229 |
| 2,204,885 | 6/1940 | Chamberlin | |
| 2,694,414 | 11/1954 | Seyferth | |
| 2,757,688 | 8/1956 | Klinger | |
| 4,182,373 | 1/1980 | Lewis | 137/625.44 |

FOREIGN PATENT DOCUMENTS 650280 2/1952 United Kingdom ................ 251/279

Primary Examiner—Martin P. Schwadron
Assistant Examiner—John S. Starsiak, Jr.
Attorney, Agent, or Firm—Dowell & Dowell

[57] ABSTRACT

A diverter valve and actuator assembly for diverting flow of a fluid from one path to another under the control of a power driven actuator, including a valve body having a chamber therein with an inlet port and two outlet ports, each outlet port having a valve seat therearound, a valve shaft extending through the body into the chamber, and a valve member carried by the valve shaft and disposed to be mated selectively with either of said valve seats by appropriate rotation of the valve shaft, and the assembly further including an actuator having a power driven shaft carrying a pivot which provides a reciprocatory component of motion with respect to the valve shaft when the actuator is driven. A control arm assembly is carried by the valve shaft and has two rigid arms extending from the valve shaft and a resilient leaf spring arm fixed with respect to the valve shaft and extending radially therefrom between the rigid arms and spaced therefrom, the end of the resilient arm being pivotally connected by a link to the reciprocating pivot, and the actuator overdriving the link beyond the motion required to move the valve member between the seats whereby the resilient arm is bent when the valve member is seated.

10 Claims, 3 Drawing Figures

DIVERTER VALVE AND ACTUATOR ASSEMBLY

BACKGROUND AND PRIOR ART

This invention relates to diverter valve and actuator assemblies which are especially suited for diverting the flow of fluids between different flow paths, particularly oil well pumped fluids which contain not only liquid and gaseous components, but which usually contain solid detritus such as sand, gravel, rust, paraffin, etc. Such solid matter has a tendency to jam most types of diverter valves, and in addition tends to build up deposits and/or corrosion on the valve members. The present invention seeks to provide a valve and actuator mechanism that can never be jammed in such a way as to stop the oil flow through it, which will be able to crush much of the solid matter, and which will be able to protect itself from damage when jammed by a non-crushable solid.

The prior art shows in U.S. Pat. No. 4,182,373 to Lewis a rotary valve of a type broadly similar to the present valve, and wherein the ball is mounted on an offset shaft parallel to the main valve shaft. The prior art further shows several other diverter ball valves which, however, are mounted on shafts which are normal to the main valve shaft, as illustrated in U.S. Pat. Nos. 2,757,688 to Klingler, 2,204,885 to Chamberlin, and 2,694,414 to Seyferth. In the latter patent, an additional mechanism is provided which seeks to spring load the engagement of the ball with a seat in the valve body. In this patent the ball is resilient while the seat is rigid, which is the reverse of the showing in the ball valve of the present invention.

SUMMARY OF INVENTION

This invention comprises a diverter valve and actuator assembly for diverting the flow of a fluid, such as oil being pumped from a well, from one path to another, for example from one separator tank to another. The diverting is done under the control of a power driven actuator such as a control motor which may be automatically cycled to achieve appropriate treatment of the fluid being pumped. The diverter valve itself includes a valve body having a chamber therein and having an inlet port and two outlet ports communicating with the chamber through the body, each outlet port having a valve seat facing the chamber, and the valve having a valve shaft extending through the body into the chamber and carrying a valve member disposed to be mated selectively with either of said valve seats to close the adjacent outlet port by appropriate rotation of the valve shaft, whereby to divert the fluid flow to the other outlet port. The assembly further includes a power actuator having a driven shaft carrying a pivot which has a reciprocatory component of motion with respect to the valve shaft when the actuator is driven, and the actuator having a link member supported at one end by the pivot. This link member is connected at its second end to a contol arm assembly carried by the valve shaft, the control arm comprising two rigid arms extending from the valve shaft, and resilient leaf springs fixed with respect to the valve shaft and extending radially therefrom between the rigid arms and spaced therefrom, the ends of the leaf springs being pivotally connected to the link. The actuator overdrives the link beyond the motion required to move the valve member between the seats whereby the leaf springs are bent to bias the valve member when it is seated. However if the valve member becomes jammed the leaf springs will contact the rigid arms and be urged thereby to crush the obstruction. If it is too hard for the valve member to crush, the actuator is stalled, and an automatic circuit breaker or other appropriate device disables the actuator until the blockage can be cleared. Fluid flow, however, continues through the valve even when it is jammed. In one embodiment the valve member is a ball rotatably mounted so that it seats in different rotational positions during each closure, whereby wear is distributed and corrosion and deposits tend to be knocked off during use.

It is a principal object of this invention to provide a cooperating diverter valve and actuator system in which the diverter valve is moved back and forth between opposed seats by a power driven actuator operating to reciprocate a link member which is connected to a resilient valve control arm assembly that normally biases the valve means in one or the other seated position. However, if the valve member encounters a hard lump in the fluid, the resilient control arm will first give a little and then go rigid, thereby forcing the valve member to attempt to crush the lump. In cases where the assembly fails in its crushing effort, the motion of the actuator will be stalled, thereby causing an automatic circuit breaker or some other appropriate overload device to remove the drive from the actuator and wait until the problem is cleared, for instance by manual means. The use of a resilient valve control arm is also helpful since it reduces the precision with which the actuator must be mounted relative to the valve in order to achieve accurate seating.

A corollary object of the invention is to provide the combination of a rigid valve member and specially designed valve seats which have a resilient O-ring for good sealing but a rigid retaining ring facing toward the valve member and disposed to provide rigid surfaces against which obstructions in the fluid will be subjected to crushing pressures.

It is a further object of the invention to provide an adjustable-length link member joining the actuator to the valve control arm so that the a correct amount of overtravel of the second end of the link member can be had in each valve position, whereby to distort the resilient portion of the valve control arm equally to bias the valve member without driving the resilient portion of the control arm against a rigid arm portion. The actuator itself may be electrical, hydraulic, pneumatic, or any other suitable type of valve controlling motor.

Another important object of the invention is to provide a diverter valve system in which a passage through the valve is always open, thereby to protect the fluid pump by allowing flow to continue even when the valve member becomes hung up in some intermediate position as outlined above. The valve therefore always maintains full flow regardless of position of its valve member. Moreover, by moving the actuator to an intermediate position, the valve member can be positioned halfway between the seats to provide equal flow to both outlet ports.

Still another object of the invention is to provide a valve wherein the valve member is a ball which is rotatively mounted so that it can present a different surface to the valve seat at each closure to help discourage build-up of contaminants on its surface. The ball tends to be both rotated and cleaned by the abrasive washing action of the fluid flowing past it while moving from one seated position to another.

A further feature of the invention is the structure of the resilient valve control arm and the mounting thereof to the valve shaft, wherein the ends of the resilient leaf springs are used as keys fitting into the keyway on the shaft and held there by the hub portions of the rigid arms.

The use of a ball as the valve member is not necessary. The ball can be replaced by a plate valve, for instance in the form of a disc as shown in an alternative embodiment.

An advantageous feature of one embodiment of the invention is the structure of the valve body and side walls wherein at least one side wall comprises a plate which is quickly and easily removable to facilitate cleaning or repair of the valve in the field. If desired for the sake of cheaper manufacture, one of the side plates can be integrally cast with the body, leaving only the second sided plate removably bolted in place.

Other objects and advantages of the invention will become apparent during the following discussion of the drawings.

DESCRIPTION OF PREFERRED EMBODIMENTS

Figure 1:
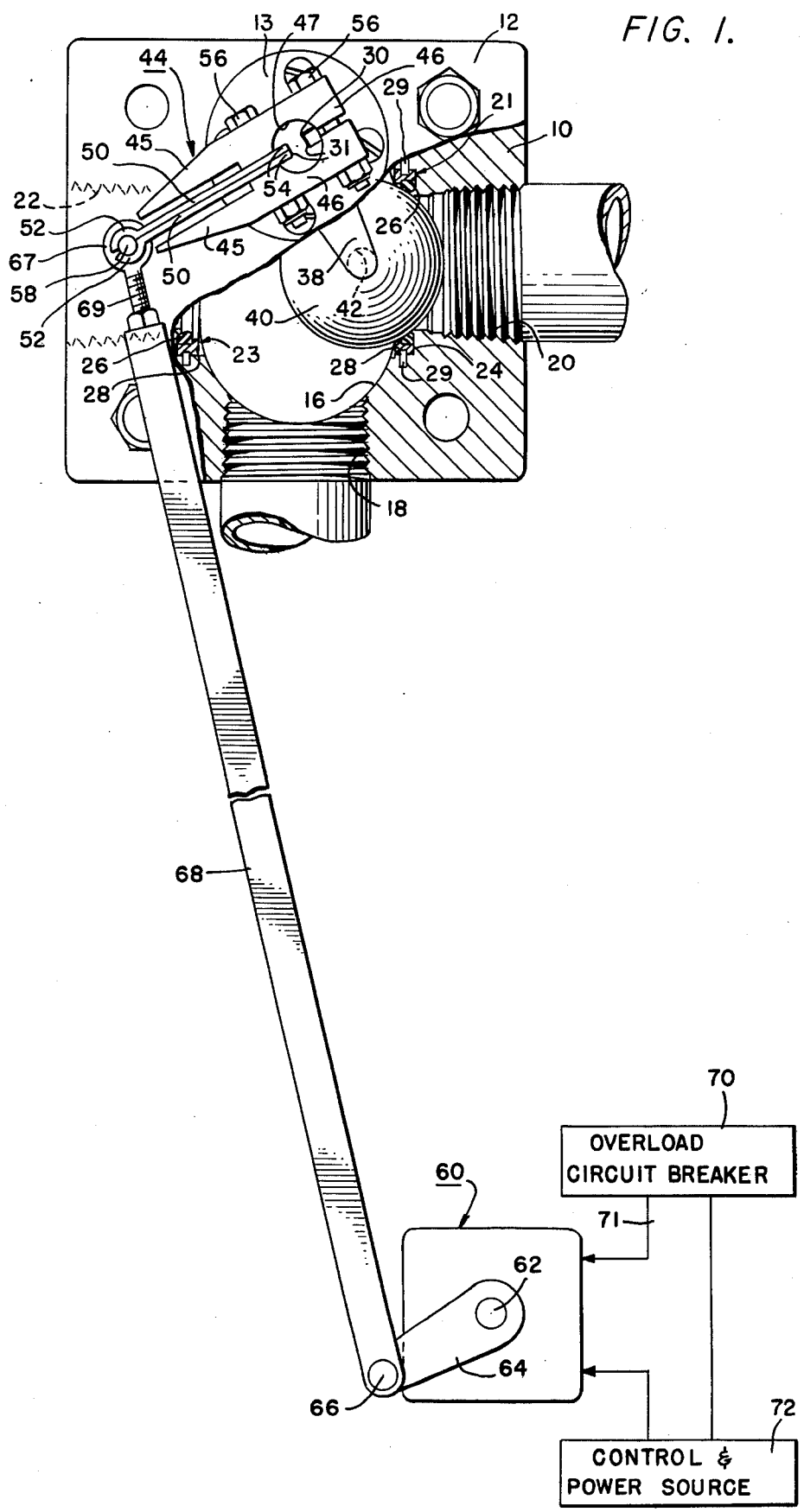
FIG. 1 is an elevation view, partially in cross section, showing a preferred embodiment of the invention including a diverter valve and actuator attached thereto, the actuator being protected by an overload breaker circuit.
Figure 2:
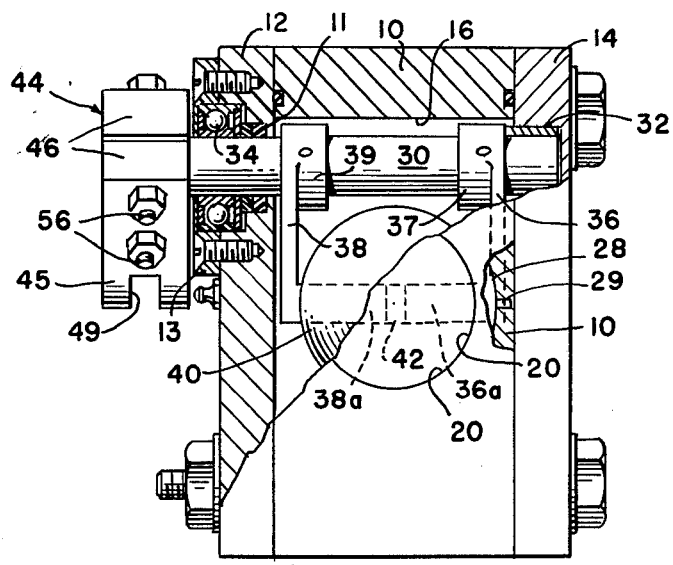
FIG. 2 is a left end elevational view of the diverter valve.

Referring now to the drawings, FIGS. 1 and 2 show a preferred embodiment of the invention, wherein the diverter valve includes a body 10 having two opposed walls comprising side plates 12 and 14, of which at least the plate 12 is removable from the body, being bolted thereto in use. Alternatively, in this embodiment the side plate 14 may be cast or otherwise made integral with the body 10. The body has a central chamber 16 therein and has an inlet port 18 which communicates with two different fluid flow paths comprising the outlet ports 20 and 22, the ports in this embodiment being shown as having pipe threads to facilitate connection thereto. Valve seats 21 and 23 are provided at the intersections of the outlet ports with the chamber, the valve seat 21 at the port 20 being typical and comprising a cylindrical groove 24 in the body surrounding the outlet port entrance and receiving a rubber O-ring 26 which is held in the bottom of the groove by a metal retaining ring 28, FIG. 1. The retaining ring 28 is held in place in the groove 24, compressing the O-ring 26 slightly, by retaining pins 29 located on opposite sides of the ring and extending therethrough into the body 10. The valve seat 23 at the opposite outlet port 22 is similar and bears similar reference characters.

The side plates 12 and 14 have aligned bearings which receive the valve shaft 30 which passes through the chamber 16 and has an outer end extending beyond the plate 12. The inner end of the valve shaft 30 is supported in the bearing 32 whereas a portion of the valve shaft 30 nearer its outer end is supported in a ball bearing assembly 34 which is supported by a ring 13 attached to the side plate 12, the shaft being sealed by a seal member 11. In the embodiment of FIGS. 1 and 2 the valve shaft 30 carries a pair of supporting arms 36 and 38 which are pinned to the shaft 30 at their bosses 37 and 39 forming their inner ends. The arms each carry a stub shaft 36a and 38a which are mutually aligned. These stub shafts support a valve member 40 comprising in this embodiment a stainless steel ball having a bore 42 therethrough which is a sliding fit on the stub shafts 36a and 38a so that the ball 40 can rotate thereon to present a different surface to the valve seat with each successive closure. The ball valve member 40 is rocked from one valve seat through intermediate positions within the chamber 16 to the other valve seat when the valve shaft 30 is rotated.

The outer end of the shaft 30 supports a valve control arm assembly 44 which comprises two mating rigid arms, each having a rigid arm portion 45 and a hub portion 46 with a semicylindrical portion 47 shaped to partially surround the shaft 30. The outer end of the shaft 30 has keyways 31 milled into it. The arm assembly further includes two opposed leaf springs 50 each having a pin-receiving cupped outer end 52 and an inner end 54. The leaf springs are inserted between the rigid arm portions 45 and have their inner ends 54 inserted into a keyway 31. Bolts 56 transfix the hub portions 46 of the rigid arms and the leaf springs 52 and clamp them tightly on the shaft 30 with the inner ends of the leaf springs keying the arm assembly 44 on the shaft for unitary rotation therewith. The cupped ends 52 of the leaf springs support a coupling pin 58 between them for coupling the control arm assembly 44 to actuator means for moving the shaft which is about to be described, and when so coupled the leaf springs serve as a resilient coupling arm which is yieldable within limits provided by the adjacent rigid arm portions 45.

The actuator means which serves to position the valve shaft 30 can take any suitable form, such as an electric motor, hydraulic or pneumatic motor, cylinder and piston means, solenoid means, etc., as desired. The illustrative embodiment, however, shows a rotary electric motor 60 having a power driven shaft 62 carrying a crank 64 having a pivot pin 66 near its outer end that rotates about the shaft 62 as the motor rotates, thereby producing a reciprocating component of motion with respect to the valve shaft 30. A link 68 couples the pivot pin 66 with the coupling pin 58 at the valve, the length of the link 68 being of a conveniently adjustably turnbuckle type having a threaded member 69 to facilitate setting up the assembly for proper operation of the valve. The threaded member 69 has an eye portion 67 shaped to receive the pin 58, and both rigid arm portions 45 are slotted as shown at 49 in FIG. 2 to provide clearance between the eye portion 67 and the rigid arm portions 45 when the leaf springs 50 are bent from their centered positions therebetween. In addition, the length of the crank 64 between the pivot pin 66 and the driven shaft 62 is selected so that the reciprocatory component of motion of the pin 66 with respect to the valve shaft 30 is slightly greater than the motion required to just move the valve shaft 30 enough to rock the ball 40 from seated position on one seat to seated position on the opposite seat, thereby providing a degree of overtravel of both pins 58 and 66 so that, at the seated positions of the ball valve member 40, the resilient arm portions comprising the leaf springs 50 will be bent from their normal positions centered between the rigid arms 45 whereby to spring bias the ball against the adjacent seat. The amount of biasing is determined by the spacing along the the crank between the shaft 62 and the pin 66, whereas proper adjustment of the length of the link 68 distributes the overtravel of the pin 58 equally between the two seated positions of the valve member.

Some sort of overload protection must be provided for the actuator 60 to protect both it and the valve structure in case the valve member 40 becomes thoroughly jammed by a non-crushable lump becoming wedged between the valve member 40 and a seat which it is approaching. Since the illustrated actuator 60 is an electric motor, overload protection is provided by an electrical Overload Circuit Breaker 70 which is in series with one lead 71 of the electric circuit connecting a conventional Control & Power Source 72 to the motor 60. In the case where a pneumatic or hydraulic actuator is used, the Circuit Breaker 70 would be replaced by an appropriate device, such as a by-pass valve, as well known in the art.

Figure 3:
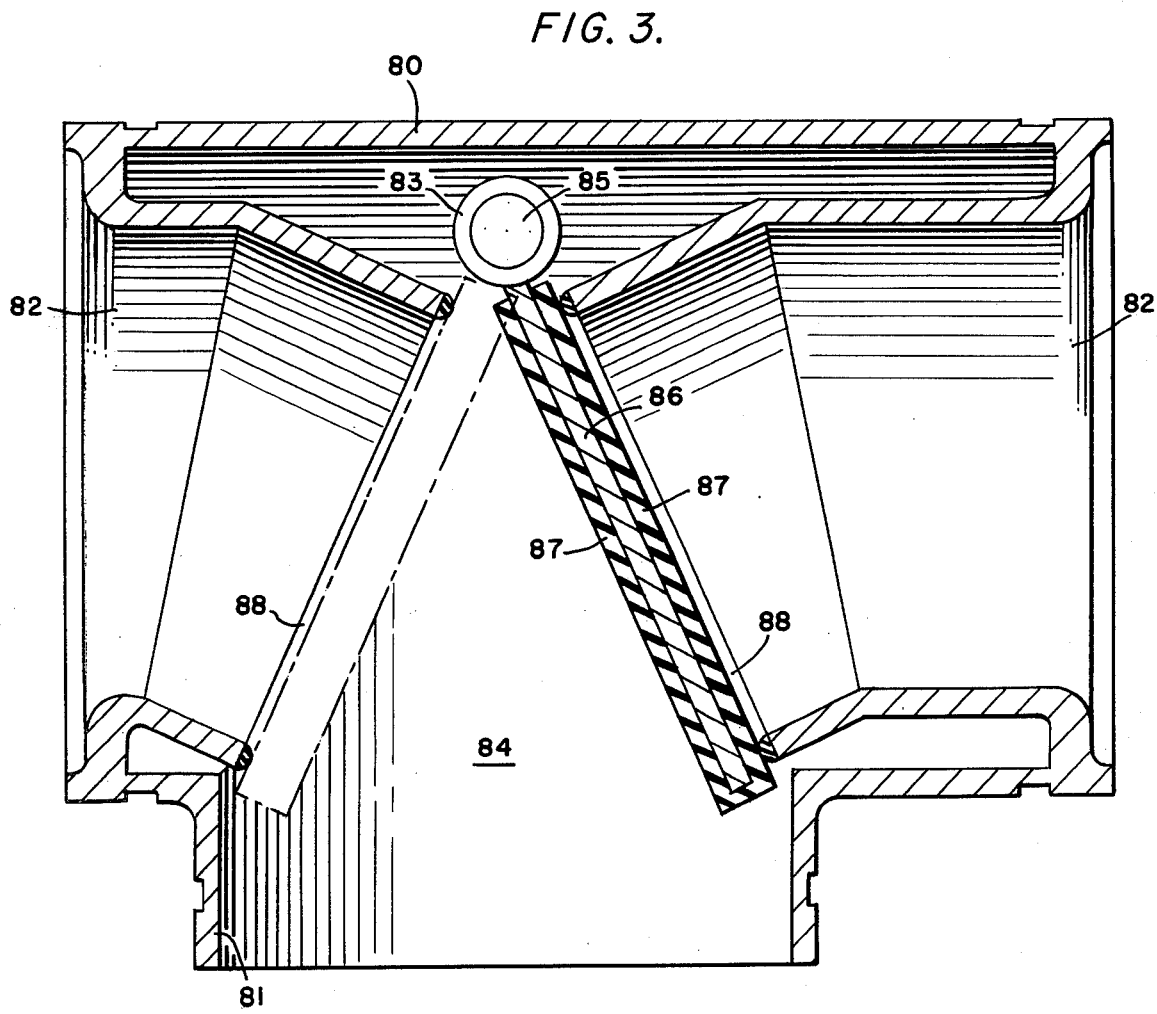
FIG. 3 is a sectional view through an alternative form of diverter valve which is also useable in the present assembly.

FIG. 3 shows a less expensive form of valve member and valve body which comprises a body 80 having an inlet port 81 and outlet ports 82 which are exteriorly shaped for victaulic type connection to external piping. The body has a chamber 84 and has opposed walls through which a valve shaft 85 extends, the shaft being supported in bearings 83 similar to those shown in FIG. 2, and the outer end of the shaft being attached to a control arm assembly (not shown) which is the same as the assembly 44 of the previously described embodiment. This valve is therefore substitutable for the valve shown in FIGS. 1 and 2, and when so substituted is connected in a similar way to an actuator mechanism. The valve of FIG. 3, however, uses a plate or disc valve member 86 which is mounted directly on the shaft 85 and carries a plastic facing 87, each valve seat on the body 80 being provided with a yieldable gasket material 88 to insure fluid tight sealing of the valve member 86 when seated. The body 80 of this embodiment comprises cylindrical side walls having no removable side plates, the port 81 being large enough to permit easy assembly of the disc 86, 87 therethrough.

In operation, the actuator 60 is driven at controlled times and through controlled angular motions from the Control & Power Source 72, the power passing through a conventional Overload Circuit Breaker 70 which will interrupt the power flow to the actuator at any time when the valve becomes jammed so that the current drawn by the motor exceeds a limit for which the Circuit Breaker 70 is set, the power remaining off until manually reset after the blockage preventing movement of the valve has been cleared. However, it is intended that except in the case of a very hard and non-crushable blockage, the motor 60 will continue to drive the control arm assembly 44 to cause the valve member to crush an obstruction and close the valve member on the seat which it is approaching at the time. Thus when a semi-rigid, but still crushable obstruction tries to stall movement of the valve member toward a seat, continued drive from the actuator motor 60 begins to bend the resilient leaf spring arm 52. When sufficiently bent, the resilient arm will contact the adjacent rigid arm portion 45 and thereby greatly stress the obstruction by putting the full power of the actuator into the crushing effort of the valve member. If the obstruction crushes, it will flush on through the outlet port as the valve member 40 approaches seating. However, in those cases where the obstruction can not be be crushed, the additional current eventually drawn by the actuator motor 60 as its shaft becomes stalled will open the Overload Circuit Breaker 70 and save the motor from being burned out.

In the embodiment of the invention being currently manufactured, a stainless steel ball 40 is used. Moreover, the retaining ring 28 in each valve seat provides a rigid annulus facing toward the ball to act as an obstruction-crushing member together with the ball. However, during ordinary closing of the valve the retaining ring 28 is so proportioned that the ball will not touch it, but will instead come to rest against the rubber O-ring 26 and compress it to provide a fluid tight seal. It is important to notice that the diverter valve can not be jammed in such a way as would prevent flow of fluid therethrough in the event its valve member will not seat. This is because the fluid can flow through both outlet ports 20 and 22 when the valve member is stopped at some intermediate location between the two valve seats.

This invention is not to be limited to the illustrative embodiments shown and described, for changes may be made within the scope of the following claims.

I claim:

1. A diverter valve and actuator assembly for diverting the flow of a fluid from one path to another under the control of a power driven actuator, comprising:

(a) a valve body having a chamber therein closed by opposed side walls, and the valve body having an inlet port communicating with the chamber and having two outlet ports extending from the chamber through the body and each outlet port having a valve seat therearound where the port enters the chamber, and the body having shaft receiving bearings in its side walls;

(b) a valve shaft supported in the bearings and extending from outside the body into the chamber, and a valve member carried by the valve shaft and disposed to be mated selectively with either of said valve seats to close the adjacent outlet port by appropriate rotation of the valve shaft;

(c) an actuator having a power driven shaft carrying a pivot which reciprocates with respect to the valve shaft when the actuator is driven, and having a link member supported at one end by the pivot and having a second end; and (d) a control arm assembly carried by the valve shaft and comprising two rigid arms extending from the valve shaft toward the second end of the link, resilient leaf spring means fixed with respect to the valve shaft and extending therefrom between the rigid arms and spaced therefrom and terminating in an outer end, and means coupling the second end of the link with the outer end of the resilient leaf spring means, whereby as the actuator is driven the arm assembly rocks the valve shaft to selectively seat the valve member on one of the valve seats.

2. A diverter valve and actuator assembly as claimed in claim 1, wherein the reciprocating motion of the actuator shaft pivot is greater than the motion of the outer end of the leaf spring means required to rock the valve shaft from seating of the valve member on one valve seat to seating on the other valve seat, whereby the leaf spring means is distorted from a normally equidistant position between the rigid arms to a position nearer one of the rigid arms whenever the valve member is seated.

3. A diverter valve and actuator assembly as claimed in claim 1, wherein the valve shaft has a keyway there-along, the rigid arms comprise two rigid members each having hub portions partially surrounding the shaft adjacent the keyway and having parallel mutually spaced arm portions extending from the shaft, the leaf spring means extending between the arm portions and terminating at an inner end extending into the keyway, and bolts transfixing the hub portions and the leaf spring means and clamping the control arm assembly on the shaft.

4. A diverter valve and actuator assembly as claimed in claim 1, wherein the resilient leaf spring means comprise two leaf springs having pin receiving cupped outer ends facing eachother, and wherein said second end of the link has a bearing hole therethrough, and wherein the coupling means comprises a pin passing through the cupped ends of the leaf springs and through the bearing hole in the link to pivotally connect the arm assembly to the link.

5. A diverter valve and actuator assembly as claimed in claim 1, wherein each valve seat surrounding an outlet port where it enters the chamber comprises a groove cut in the body with an O-ring in the groove, a retaining ring adjacent the O-ring, and means to keep the retaining ring compressing the O-ring in the groove.

6. A diverter valve and actuator assembly as claimed in claim 1, wherein at least one of the side walls of the body comprises a removable side plate bolted to the body to make accessible the interior of the body, the valve shaft, the valve seats and the valve member.

7. A diverter valve and actuator assembly as claimed in claim 1, wherein the valve member comprises a ball having a bore therethrough, and the valve shaft supports two ball-supporting arms located inside the chamber and extending radially from the shaft, the ball-supporting arms each having a stub shaft extending toward the other stub shaft and aligned therewith, and the ball receiving the stub shafts in its bore and being rotatable thereon.

8. A diverter valve and actuator assembly as claimed in claim 7, wherein the ball is made of rigid substantially unyielding material.

9. A diverter valve and actuator assembly as claimed in claim 1, wherein said valve member comprises a plate carried by the valve shaft and disposed to overlie either of the valve seats when the shaft is rocked theretoward.

10. A diverter valve and actuator assembly as claimed in claim 1, wherein said actuator comprises a rotary motor having a crank extending radially from its power driven shaft, and the crank carrying said pivot offset from the center of the driven shaft, whereby the pivot reciprocates with respect to the valve control arm assembly when the driven shaft is rotated.

* * * * *